United States Patent
Ehrlich (10) Patent No.: US 11,110,973 B2
(45) Date of Patent: Sep. 7, 2021

(54) FLOOR ASSEMBLY AND FLOOR SECURING APPARATUS

(71) Applicant: WABASH NATIONAL, L.P., Lafayette, IN (US)

(72) Inventor: Rodney P. Ehrlich, Monticello, IN (US)

(73) Assignee: WABASH NATIONAL, L.P., Lafayette, IN (US)

( * ) Notice: Subject to any disclaimer, the term of this patent is extended or adjusted under 35 U.S.C. 154(b) by 0 days.

(21) Appl. No.: 16/740,117

(22) Filed: Jan. 10, 2020

(65) Prior Publication Data

US 2020/0148284 A1  May 14, 2020

Related U.S. Application Data

(63) Continuation of application No. 15/689,913, filed on Aug. 29, 2017, now Pat. No. 10,549,795.

(60) Provisional application No. 62/384,418, filed on Sep. 7, 2016, provisional application No. 62/381,760, filed on Aug. 31, 2016.

(51) Int. Cl.

| B62D 33/04 | (2006.01) |
|---|---|
| B62D 27/06 | (2006.01) |
| B62D 65/02 | (2006.01) |
| B62D 25/20 | (2006.01) |

(52) U.S. Cl.
CPC ....... *B62D 33/044* (2013.01); *B62D 25/2054* (2013.01); *B62D 27/065* (2013.01); *B62D 33/048* (2013.01); *B62D 65/02* (2013.01); *B60Y 2304/05* (2013.01)

(58) Field of Classification Search
CPC .. B62D 25/2054; B62D 29/043; B62D 33/02; B62D 21/02; B62D 33/04; B62D 33/046; B62D 33/048; B62D 21/09
USPC ...... 296/184.1, 204, 193.07, 187.01, 203.02, 296/75, 35.1, 29, 208, 191; 52/588.1, 52/177, 783.1, 579, 582.1, 90.1, 385
See application file for complete search history.

(56) References Cited

U.S. PATENT DOCUMENTS

| 3,128,851 | A | | 4/1964 | Deridder et al. |
| 3,941,272 | A | * | 3/1976 | McLaughlin ........... B63B 25/12 220/560.11 |
| 4,631,891 | A | | 12/1986 | Donavich |
| 4,703,948 | A | | 11/1987 | Ehrlich |
| 4,951,992 | A | | 8/1990 | Hockney |
| 5,928,735 | A | | 7/1999 | Padmanabhan et al. |
| 6,006,486 | A | * | 12/1999 | Moriau ................... F16B 5/008 52/589.1 |
| 6,082,810 | A | | 7/2000 | Bennett |
| 6,339,908 | B1 | | 1/2002 | Chuang |

(Continued)

FOREIGN PATENT DOCUMENTS

EP  2431248 A1  3/2012

*Primary Examiner* — D Glenn Dayoan
*Assistant Examiner* — Sunsurraye Westbrook
(74) *Attorney, Agent, or Firm* — Quarles & Brady LLP (57) ABSTRACT

A floor securing apparatus comprises a riser slot formed in a floor riser, extending from a top surface toward a bottom surface of the floor riser. The floor riser is configured to support a floor sheet. The apparatus further includes a key including a locking head and at least one anchor tab, where the key is slidable into the riser slot and configured to engage a portion of the floor sheet when slid into the riser slot to prevent vertical movement of the floor sheet relative to the floor riser.

20 Claims, 5 Drawing Sheets

(56) References Cited

U.S. PATENT DOCUMENTS

| | | | |
|---|---|---|---|
| 6,834,911 B2 | 12/2004 | Schillinger et al. | |
| 7,114,304 B2 | 10/2006 | Aota et al. | |
| 7,181,889 B2 | 2/2007 | Perkowski et al. | |
| 7,517,005 B2 | 4/2009 | Kuriakose | |
| 8,006,458 B1 * | 8/2011 | Olofsson | E04F 15/02022 |
| | | | 52/582.1 |
| 8,375,656 B2 | 2/2013 | Ehrlich | |
| 8,517,423 B1 | 8/2013 | Huston et al. | |
| 8,544,233 B2 * | 10/2013 | Palsson | E04F 15/02038 |
| | | | 52/588.1 |
| 8,627,631 B2 * | 1/2014 | Thiers | E04F 15/102 |
| | | | 52/591.1 |
| 8,690,189 B2 | 4/2014 | Huston et al. | |
| 8,696,048 B2 | 4/2014 | Griffin et al. | |
| 9,347,225 B2 | 5/2016 | Glancy et al. | |
| 9,676,549 B2 | 6/2017 | Adams | |
| 9,938,725 B2 | 4/2018 | Johnson et al. | |
| 9,994,262 B1 * | 6/2018 | Kube | B62D 25/2054 |
| 10,059,512 B2 | 8/2018 | Adams | |
| 10,150,515 B1 * | 12/2018 | Stojkovic | B60N 3/048 |
| 10,239,566 B2 | 3/2019 | Bauer et al. | |
| 10,293,770 B2 | 5/2019 | Owens et al. | |
| 10,329,763 B2 | 6/2019 | McCloud et al. | |
| 10,407,103 B2 | 9/2019 | Hatke | |
| 10,479,405 B2 | 11/2019 | Bauer et al. | |
| 10,479,419 B2 | 11/2019 | Storz et al. | |
| 10,538,051 B2 | 1/2020 | McCloud et al. | |
| 10,549,789 B2 | 2/2020 | McCloud | |
| 2004/0025467 A1 | 2/2004 | Aota et al. | |
| 2004/0090036 A1 | 5/2004 | Schillinger et al. | |
| 2007/0126262 A1 | 6/2007 | Baker et al. | |
| 2017/0130465 A1 | 5/2017 | Claudin | |
| 2017/0240216 A1 | 8/2017 | Bauer et al. | |
| 2017/0241134 A1 | 8/2017 | McCloud et al. | |

* cited by examiner

FLOOR ASSEMBLY AND FLOOR SECURING APPARATUS

CROSS REFERENCE TO RELATED APPLICATIONS

The present application is a continuation of U.S. application Ser. No. 15/689,913, filed on Aug. 29, 2017, which claims the benefit of U.S. Provisional Application No. 62/381,760, filed on Aug. 31, 2016, and U.S. Provisional Application No. 62/384,418, filed on Sep. 7, 2016.

BACKGROUND

The present disclosure relates generally to a floor assembly and floor securing apparatus and, more particularly, to a floor assembly and floor securing apparatus for securing floor sheet to structural components of refrigerated trailers.

Refrigerated trailers need to be securely assembled to withstand the rigors of a long service life while minimizing manufacturing and materials costs. Many prior art embodiments require placing the flooring materials in place, drilling holes through the flooring materials into the floor assembly substructure, and securing the flooring materials with an attachment device. These methods for securing a floor require a significant amount of labor and require a lot of movement by the workers placing the flooring materials and drilling and then moving to the next spot to drill. Further, the skills of the laborer placing the materials not only affect labor costs, but material cost as well. Inefficient placement may result in trimming flooring materials that increase the amount of materials discarded. Further still, prior art floor securing apparatuses may induce stress in the floor materials causing the floor materials to fatigue and break.

Accordingly, in a floor securing apparatus and floor assembly, there is a need to minimize the amount of labor required to place and secure the flooring materials and reduce or eliminate wasted materials. Further, there is a need to minimize stress introduced by securing the floor materials to the floor assembly substructure to insure a long and maintenance free service life.

SUMMARY

In illustrative embodiments, a floor assembly may comprise a floor sheet including a first end and a second end, the first end including a protrusion extending from a bottom surface thereof, the protrusion forming a notch and a floor riser configured to support the floor sheet, the floor riser including at least one riser slot, wherein at least a portion of the protrusion of the floor sheet is positioned within at least a portion of the riser slot. The floor assembly may further comprise a key including a locking head and at least one anchor tab, wherein the key is positioned within the riser slot with a portion of the locking head positioned within the notch of the protrusion to secure the floor sheet to the floor riser to prevent vertical movement of the floor sheet relative to the riser.

In some embodiments, the second end of the floor sheet is configured to mate with a foot of the first end of a further floor sheet.

In some embodiments, the floor riser further includes a plurality of riser slots spaced apart such that a number of floor sheets may be connected to one another, thereby forming a continuous flooring surface.

In some embodiments, the key further includes a plurality of anchor tabs extending in opposing directions.

In some embodiments, the key further includes a spine and at least one anchor tab disposed at a non-90 degree angle with respect to the spine.

In some embodiments, the bottom surface of the floor sheet and the protrusion of the first end of the floor sheet extend a full length of the floor section.

In some embodiments, the first end of the floor sheet is connected to a second end of a second floor sheet by a weld.

In some embodiments, a top surface of the key is flush with a top surface of the riser.

In some embodiments, the first end of the floor sheet further includes a downwardly extending foot having a first portion that abuts at least a portion of a top surface of the key and a second portion that includes a first coupling extension that extends away from the floor sheet, the second end of the floor sheet includes a downwardly extending leg having a second coupling extension extending away from the floor sheet, and the first and second coupling extensions of different floor sheets are positioned adjacent one another when the different floor sheets are connected and the first and second coupling extensions are further configured to be welded together.

In some embodiments, the first end of the floor sheet further includes a downwardly extending foot from which the protrusion extends, the second end of the floor sheet includes a downwardly extending leg, and the downwardly extending leg of the second end and the downwardly extending foot of adjacent floor sheets are positioned adjacent one another and portions of the downwardly extending leg of the second end and the downwardly extending foot are welded.

In some embodiments, the downwardly extending foot includes a notch that receives and retains a projection that extends inwardly from the downwardly extending leg.

In some embodiments, the first end of the floor sheet further includes a downwardly extending foot from which the protrusion extends, the downwardly extending foot further including a first toe portion, the second end of the floor sheet includes a downwardly extending leg with an outwardly extending foot having a second toe portion, and the first and second toe portions of different floor sheets are positioned adjacent one another and a weld beam is positioned between the first and second toe portions.

In some embodiments, the downwardly extending foot further includes an upwardly locking heel that is spaced from the first toe portion to create a depression configured to form a snap fit engagement with the outwardly extending foot of the second end of an adjacent floor sheet when different floor sheets are positioned adjacent one another.

In some embodiments, the first end of the floor sheet further includes a downwardly extending foot, the protrusion forming the notch being positioned at a lower end of the downwardly extending foot and further including a second notch formed within the downwardly extending foot and spaced from the protrusion forming the notch, the second end of the floor sheet includes a flange, and at least a portion of the flange of one floor sheet is configured to be positioned within the second notch of an adjacent floor sheet and a weld beam is positioned in contact with portions of the first and second ends of the floor sheets adjacent the flange and the second notch.

In another illustrative embodiment, a method of assembly floor sections using a floor securing apparatus is disclosed, wherein the floor securing apparatus includes a first floor sheet having first and second ends and a protrusion forming a notch positioned at the first end, a floor riser having a riser slot formed therein, and a key including a locking head and at least one anchor tab. The method includes the steps of positioning at least a portion of the protrusion of the first end of the first floor sheet in at least a portion of the riser slot, sliding the key into the slot with the locking head of the key positioned within the notch of the first floor sheet, and positioning a second floor sheet identical to the first floor sheet with a second floor sheet surface adjacent a first floor sheet surface of the first floor sheet.

In some embodiments, the method further includes the step of positioning a weld beam adjacent the first floor sheet surface and the second floor sheet surface.

In a further illustrative embodiment, a floor securing apparatus includes a riser slot formed in a floor riser transverse to a longitudinal axis of the floor riser, the floor riser configured to support a floor sheet and a key including a locking head and at least one anchor tab, wherein the key is slidable into the riser slot transverse to the longitudinal axis of the floor riser, wherein the key is configured to engage a portion of the floor sheet to prevent vertical movement of the floor sheet relative to the floor riser.

In some embodiments, the locking head is positioned within the riser slot when the key is positioned within the riser slot.

In some embodiments, the locking head extends outwardly away from the riser and is not positioned within the riser slot when the key is positioned within the riser slot.

In some embodiments, a lower surface of the locking head and an upper surface of the riser section form a cavity into which a portion of a floor section is configured to be positioned within the cavity to secure the floor sheet to the floor riser to prevent vertical movement of the floor sheet relative to the riser.

BRIEF DESCRIPTION OF THE DRAWINGS

Other aspects and advantages of the present disclosure will become apparent upon consideration of the following detailed description, wherein similar structures have like or similar reference numerals.

DETAILED DESCRIPTION

The present disclosure is directed to floor assemblies and floor securing apparatuses for securing flooring or floor sheets or sections to structural members of refrigerated trailers. While the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

Figure 1:
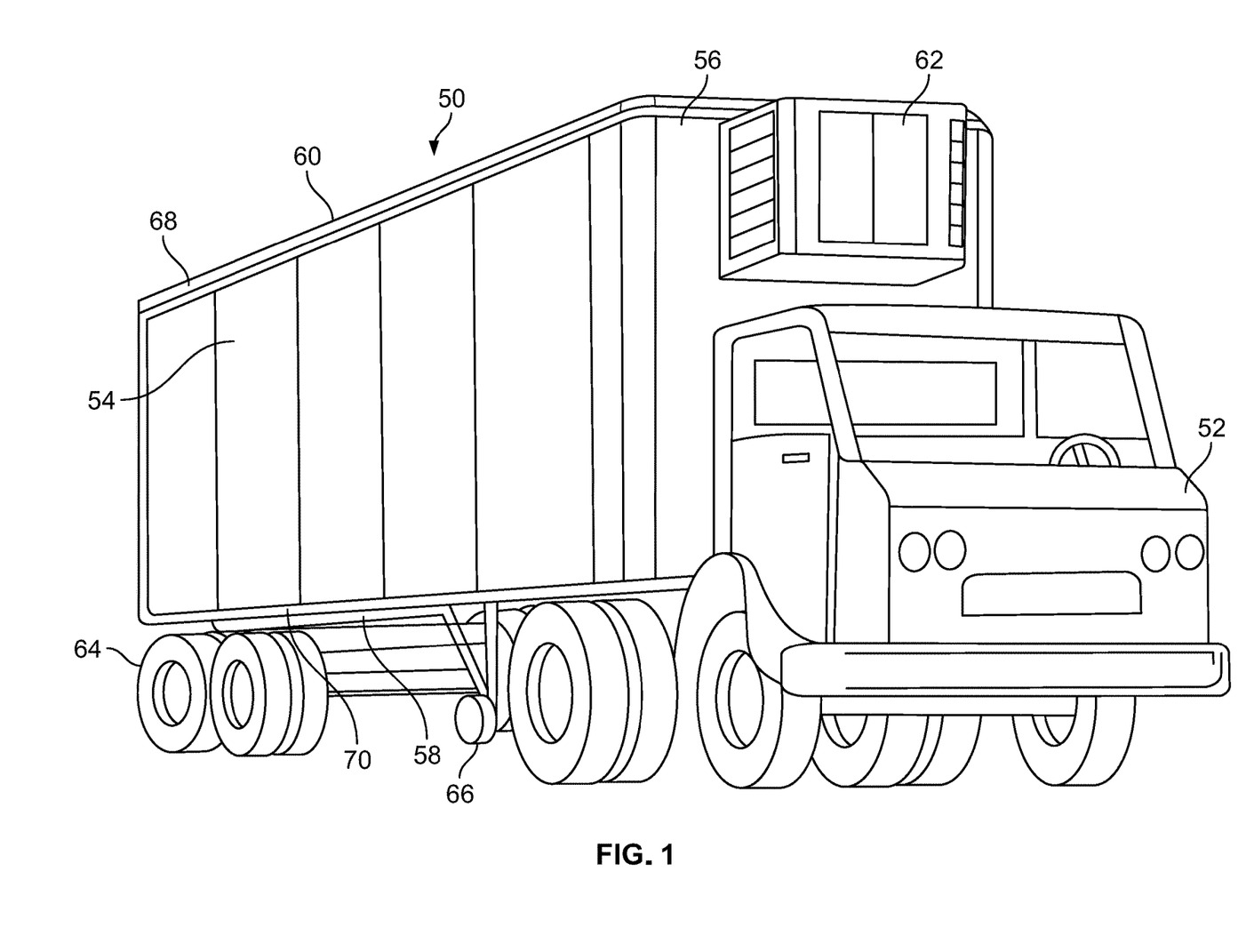
FIG. 1 is a front and left side perspective view of a refrigerated trailer and tractor.

Referring to FIG. 1, an exemplary refrigerated trailer 50 and tractor 52 are depicted. The refrigerated trailer 50 includes a body formed from a pair of rectangular sidewalls 54 (only the passenger side is visible), a front wall 56 and, a rear frame assembly comprising loading doors (not shown), a floor assembly 58, and a roof assembly 60. The front wall 56 includes a refrigeration unit 62 provided thereon in any suitable manner. A rear portion of the floor assembly 58 is supported by a conventional rear undercarriage assembly 64. Conventional landing gear 66 may extend from below a front portion of the floor assembly 58 to support a front portion of the refrigerated trailer 50 when the refrigerated trailer 50 is not secured to a tractor 52. The refrigerated trailer 50 also includes an upper side rail 68 that couples the roof assembly 60 to an upper portion of each sidewall 54. The floor assembly 58 and a lower portion of each sidewall 54 are coupled together by a lower side rail 70. The refrigerated trailer 50 may be coupled to the tractor 52 by any means known to one having ordinary skill in the art, such as a fifth wheel assembly. In other embodiments, the vehicle may not include a separate refrigerated trailer 50 and tractor 52, but instead, may be a refrigerated van.

Figure 2:
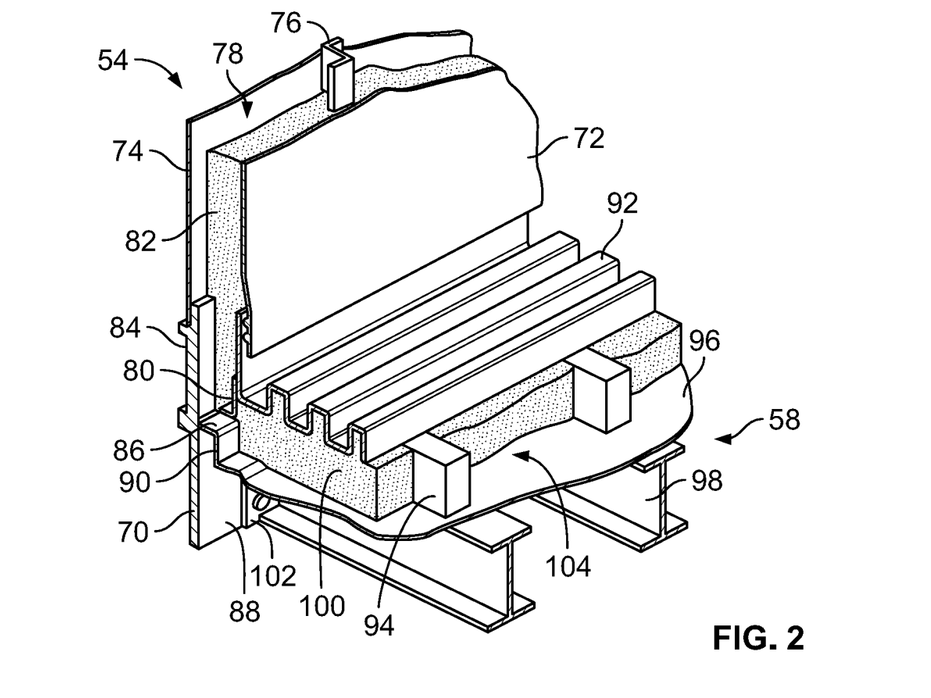
FIG. 2 is a cutaway front, top, and right side perspective view of portions of a sidewall and floor assembly of the refrigerated trailer of FIG. 1.

Turning now to FIG. 2, a cutaway depicting exemplary internal structural elements of the sidewalls 54 and floor assembly 58 is depicted. As shown, each sidewall 54 includes an inner skin 72, an outer skin 74, and at least one sidewall post 76 coupled therebetween. The sidewall posts 76 are generally mounted between the inner and outer skins 72, 74 of the sidewalls 54 and are spaced apart from each other along the length of each sidewall 54. When assembled, the inner skin 72 is spaced apart from the outer skin 74 such that a wall cavity 78 is formed therebetween. A seal 80 is provided at the bottom of the cavity 78 to separate the sidewall 54 from the floor assembly 58. Self-expanding foam is installed between the inner skin 72 and the outer skin 74 to create an insulating a foam core 82 within the cavity 78 of the side wall 54.

Still referring to FIG. 2, each lower side rail 70 extends the length of the respective sidewall 54 and is coupled to the outer skin 74 of the sidewall 54, a lower end of the side wall posts 76, and a portion of the seal 80 by any suitable means. As can be seen in the depiction of FIG. 2, the foam core 82 also couples to an upper portion 84 of the lower side rail 70. A support tab 86 extends inwardly at approximately a midpoint of the lower side rail 70, which separates the upper portion 84 and a lower portion 88 of the lower side rail 70. A generally Z-shaped member 90 is coupled to the underside of the support tab 86 and extends along a length of each lower side rail 70.

Continuing to refer to FIG. 2, the floor assembly 58 includes floor sheets 92, floor risers 94, a barrier sheet or sub-pan 96, cross-members 98, and a floor foam core 100. In some embodiments, the floor risers 94 generally align with the cross-members 98. Each end of the cross-members 98 includes an end clip 102 that is coupled to the lower portion 88 of the respective lower side rail 70 by any suitable means, for example, rivets or bolts. A plurality of the cross-members 98 are provided at spaced apart locations along the lower side rail 70. Each cross-member 98 is integrally formed from a conventionally formed I-beam. The barrier sheet or sub-pan 96 is positioned between the cross-members 98 and the floor risers 94. The space between the floor sheets 92 and the sub-pan 96 creates a floor cavity 104 in which the floor foam core 100 is formed from an insulating material, such as the side wall foam core 82 materials, which can be poured or injected to fill the floor cavity 104.

It is contemplated that one having ordinary skill in the art would understand the variety of materials and configurations may be used to insulate and couple the sidewalls 54 to the floor assembly 58. More particularly, the internal structural elements for the sidewalls 54 and floor assembly 58 are depicted for the purposes of example only. It should be understood that such internal structural elements may be varied without departing from the scope of the present disclosure.

Figure 3:
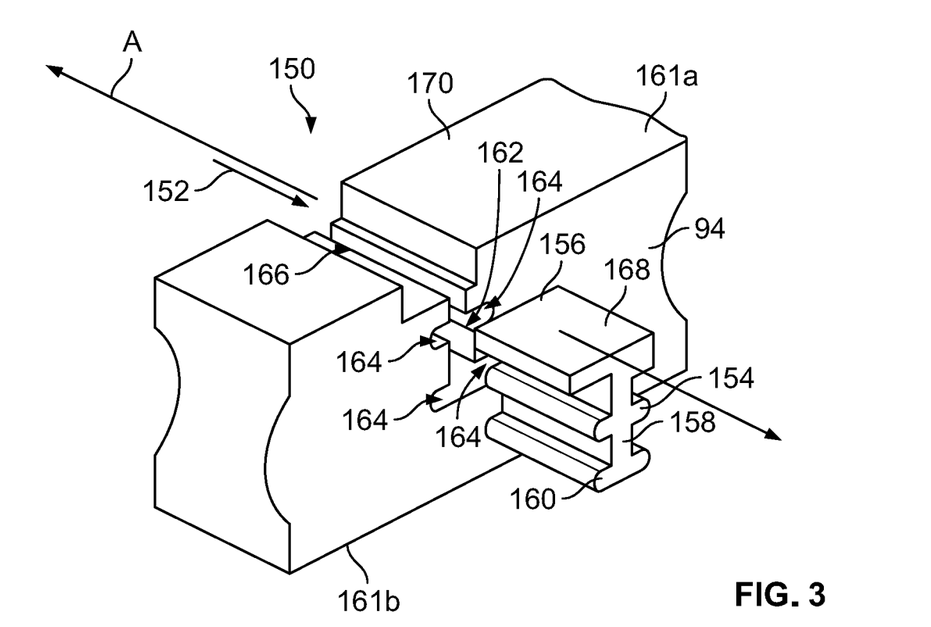
FIG. 3 is a top, front, and left side perspective view of a portion of a floor securing apparatus.

Turning now to FIG. 3, a portion of a floor securing apparatus 150 is depicted. The floor securing apparatus 150 comprises a floor riser slot 152 machined or formed in a floor riser 94 and a key 154, which is formed to slidingly engage a portion of the floor riser slot 152. The key 154 includes a head portion 156, a spine 158 that extends from the head portion 156, and one or more anchor tabs 160 that protrude outwardly from the spine 158. The floor riser slot 152 is formed in a first top surface 161a of the floor riser 94 toward an opposing bottom surface 161b. The floor riser slot 152 generally includes a vertical slot portion 162 extending into the floor riser 94, a plurality of outwardly extending slot portions 164 that are generally transverse to the vertical slot portion 162 (although only one slot portion 164 may be utilized, the vertical slot portion 162 may not be vertical, and/or the slot portion(s) 164 may be at an angle other than 90 degrees with respect to the vertical slot portion 162), and an upper slot portion 166 that forms an opening along the side surface 161a of the floor riser 94 and which may be perpendicular to the vertical slot portion 162.

As will be seen in the following embodiments, the spine 158 of the key 154 is positioned within the vertical slot portion 162, the anchor tabs 160 are positioned within the outwardly extending slot portions 164, and the head portion 156 of the key 154 is at least partially positioned within the upper slot portion 166 with an upper surface 168 of the key 154 being generally coincident or parallel to an upper surface 170 of the floor riser 94. The head portion 156 of the key 154 is configured to secure a portion of a floor sheet within the floor riser slot 152 and the anchor tabs 160 prevent the head portion 156 and spine 158 of the key 154 from being pulled vertically out of the floor riser 94 or being moved in any direction other than along a longitudinal axis A of the floor riser slot 152 and key 154 (i.e., transverse to a longitudinal axis of length of the slot 152 and key 154). While the anchor tabs 160 and the outwardly extending slot portions 164 are shown as having a particular configuration, the anchor tabs 160 and outwardly extending slot portions 164 may take other shapes, could be formed at any angle, or may be modified in any other suitable way, so long as vertical movement between the floor riser slot 152 and the key 154 and movement of the floor riser transverse to the longitudinal axis of the floor riser slot 152 and key 154 are prevented.

Figure 4:
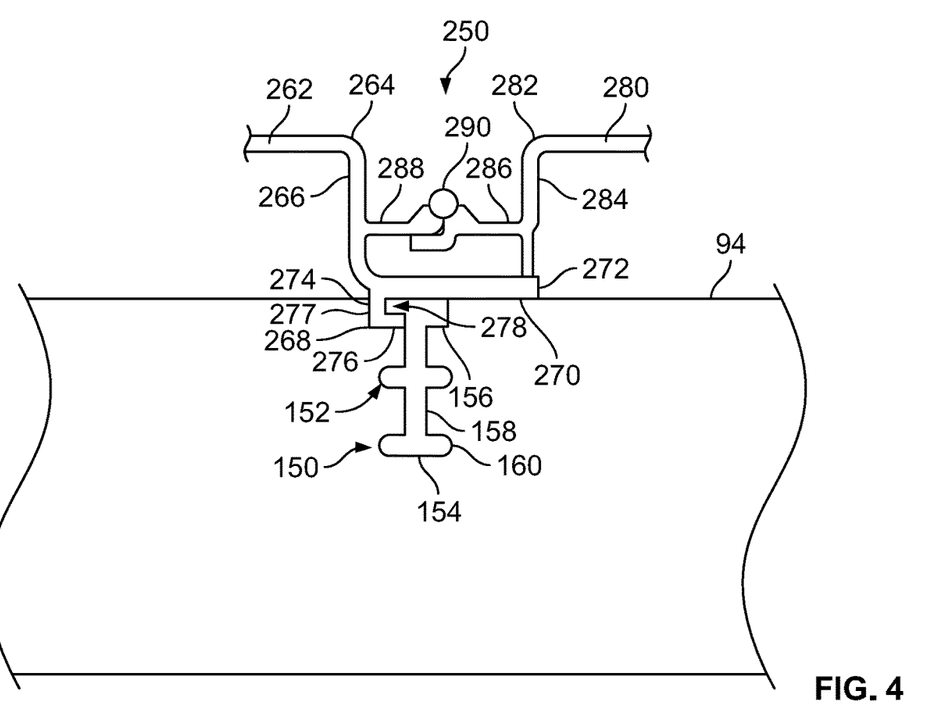
FIG. 4 is a side elevational view of a first embodiment of a floor assembly including a portion of the floor securing apparatus of FIG. 3.

Turning now to FIG. 4, a first embodiment of a floor assembly 250 including the floor securing apparatus 150 of FIG. 3 is depicted. The floor assembly 250 includes the floor securing apparatus 150 of FIG. 3, which comprises the floor riser slot 152 formed or machined into a floor riser 94 and the key 154, which is positioned within the floor riser slot 152. The floor assembly 250 further includes a first floor sheet 262 that has a first end 264 that includes a downwardly extending foot 266. A protrusion 268 extends from a lower surface 270 of a lower portion 272 of the foot 266. The protrusion 268 comprises a vertical section 274 and a horizontal section 276 that define a protrusion notch 278. The protrusion 268 may be integral with the floor sheet 262 or may be coupled to the floor sheet 262 by bonding, welding, fasteners, or any other suitable means. In some embodiments, the protrusion 268 forms part of the floor securing apparatus 150. The protrusion notch 278 is sized as to receive a portion of the head portion 256 of the key 254, thereby securing the first end 264 of the first floor sheet 262 to the floor riser 94.

Still referring to FIG. 4, a second floor sheet 280 includes a second end 282 that includes a downward extending leg 284. The downwardly extending leg 284 may extend to the floor riser 94 to provide support to the second floor sheet 280 or may extend to the lower portion 272 of the first floor sheet 262, which rests on the floor riser 94, to provide support to the first and second floor sheets 262, 280. A second end coupling extension 286 extends outwardly from the downwardly extending leg 284 toward the first end 264 of the first floor sheet 262 when the second end 282 of the second floor sheet 280 is positioned adjacent the first end 264 of the first floor sheet 262. The second end coupling extension 286 receives and contacts a first end coupling extension 288 of the first floor sheet 262, which extends from the downwardly extending foot 266. The first floor sheet 262 and the second floor sheet 280 may be permanently joined by placing a weld bead 290 along the ends of the first end coupling extension 288 and second end coupling extension 286.

During installation of one or more floor sheets 262, 280, the protrusion 268 is positioned within the upper slot portion 166 of the floor riser slot 252 and the key 254 is thereafter slid into the floor riser slot 252 in a direction perpendicular to a longitudinal axis of the floor riser 94 and with the head portion 256 of the key 254 positioned within the protrusion notch 278 of the first floor sheet 262, thereby retaining the first floor sheet 262 in position. The second floor sheet 280 is thereafter placed in position, as shown in FIG. 4, and the weld beam 290 is placed along lengths of the first and second floor sheets 262, 280. This process is repeated for each floor sheet.

It is contemplated that a load surface of the refrigerated trailer 50 is formed by multiple sections of floor sheets 262, 280 secured to the floor risers 94 by the floor securing apparatus 250. Each floor sheet 262 includes a first end 264 and an opposing second end 282; therefore, by joining a series of floor sheets 262, a continuous flooring surface can be formed above the floor risers 94 between the sidewalls 54. It is also contemplated that a lower portion of the inner skin 72 of the sidewall 54 may include an appropriate structure to couple with the first end 264 or the second end 282 of the floor sheets 262 depending on what side of the refrigerated trailer 50 the inner skin is positioned. It is also contemplated that a series of floor riser slots 152 may be pre-machined or formed in the floor risers 94 prior to positioning the floor risers 94 for assembly. Thus, the positions of the floor sheets 262 are pre-determined and simple for the location and installation of the floor sheets 262. Further, the floor sheets 262 may be formed from extrusion or other known processes. The pre-forming of the floor riser slots 152 also allows for the exact fitting of the floor sheets 262 and thus labor costs and material waste are reduced or eliminated. It is also contemplated that the keys 154 may be retained within the floor riser slot 152 after the floor cavity 104 is filled with the floor foam core 100.

Figure 5:
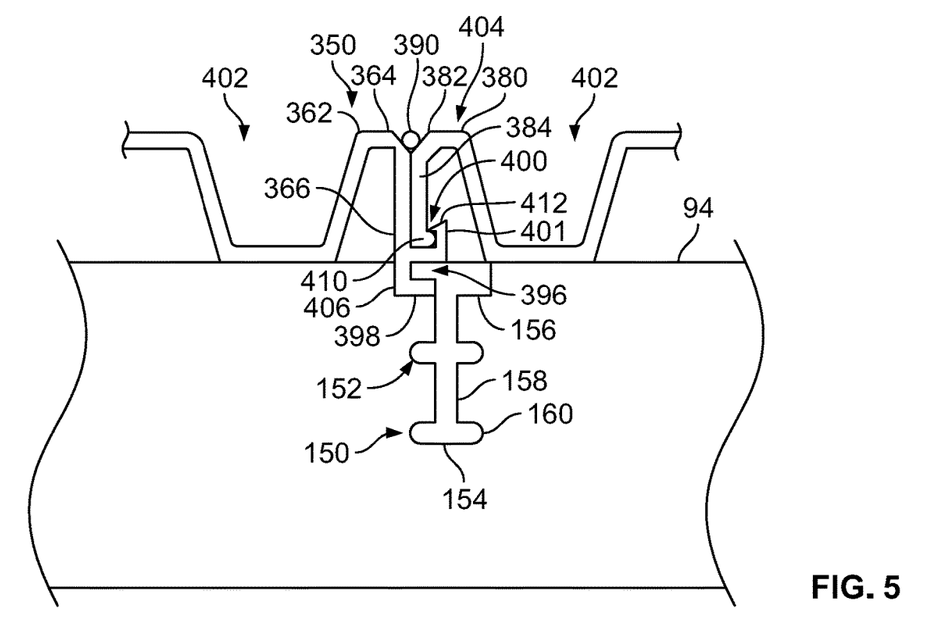
FIG. 5 is a side elevational view of a second embodiment of a floor assembly including the floor securing apparatus of FIG. 3.

Turning now to FIG. 5, a second embodiment of a floor assembly 350 is depicted. The floor assembly 350 includes at least the floor securing apparatus 150 of FIGS. 3 and 4, which comprises the floor riser slot 152 formed or machined into a floor riser 94 and a key 154, which is positioned within the floor riser slot 152. The floor assembly 350 further includes a first floor sheet 362 that has a first end 364. The first end 364 includes a downwardly extending foot 366. A horizontal notch 396 is formed by a protrusion 398 extending from the downwardly extending foot 366. The protrusion 398 may be integral with the floor sheet 362 or may be coupled to the floor sheet 362 by bonding, welding, fasteners, or any other suitable means. In some embodiments, the protrusion forms part of the floor securing apparatus 150. The horizontal notch 396 is sized to receive a portion of the head portion 156 of the key 154 when the protrusion 398 of the foot 366 is positioned within the floor riser slot 152. A vertical notch 400 is also formed in the downwardly extending foot 366 adjacent and above the horizontal notch 396 by an outwardly and upwardly extending finger 401. The vertical notch 400 is configured to receive a downwardly extending leg 384 of a second end 382 of a second floor sheet 380. A portion of the foot 366 of the first floor sheet 362 and the downwardly extending leg 384 of the second floor sheet 380 are positioned adjacent one another between the vertical notch 400 and a floor load surface 404. In illustrative embodiments, the downwardly extending leg 384 may include an outwardly extending projection 410 that is configured to form a snap or other suitable fit with a latch 412 formed on an end of the finger 401. The interaction between the projection 410 and the latch 412 retains the first and second floor sheets 362, 380 in relation to one another. Upper ends of each of the foot 366 and the downwardly extending leg 384 may be angled to form a groove for depositing a weld bead 390 to join the first and second floor sheets 362, 380. In other embodiments, the upper ends of each of the foot 366 and the downwardly extending leg 384 may not be angled or may otherwise be formed to accommodate the weld bead 390.

Similar to the first embodiment, during installation of one or more floor sheets 362, 380, the protrusion 398 is positioned within the upper slot portion 166 of the floor riser slot 152 and the key 154 is thereafter slid into the floor riser slot 152 with the head portion 156 of the key 154 positioned within the protrusion notch 396 of the first floor sheet 362, thereby vertically retaining the first floor sheet 362 in position. The slot 152 and key 154 also prevent movement of the key 154 and the floor sheets in any direction other than along the longitudinal axis A of the floor riser slot 152 and key 154 (i.e., transverse to the longitudinal axis A of length of the slot 152 and key 154). The second floor sheet 380 is thereafter placed in position, as shown in FIG. 5, with the downwardly extending leg 384 positioned within the vertical notch 400, and the weld beam 390 is placed along lengths of the first and second floor sheets 362, 380. This process is repeated for each floor sheet.

The floor assembly 350 and/or floor securing apparatus 150 evenly distribute forces applied to the weld bead 390 and the floor load surface 404 down through the downwardly extending foot 366 and downwardly extending leg 384 to the floor riser 94 and key 154. This force distribution reduces the stress and strain on the floor sheets 362, 380 thereby reducing the probability of a fatigue failure of a floor sheet 362, 380, for example, at the weld bead 390. It is also contemplated that the coupling to the inner skins 72 of the side walls 54 may be mirrored by the manner in which the first and second floor sheets 362, 380 are joined. It is also contemplated that, by placing the weld bead 390 near the floor load surface, that a plurality of cool air channels 402 may be free from obstructions and may provide increased cooling air flow.

Figure 6:
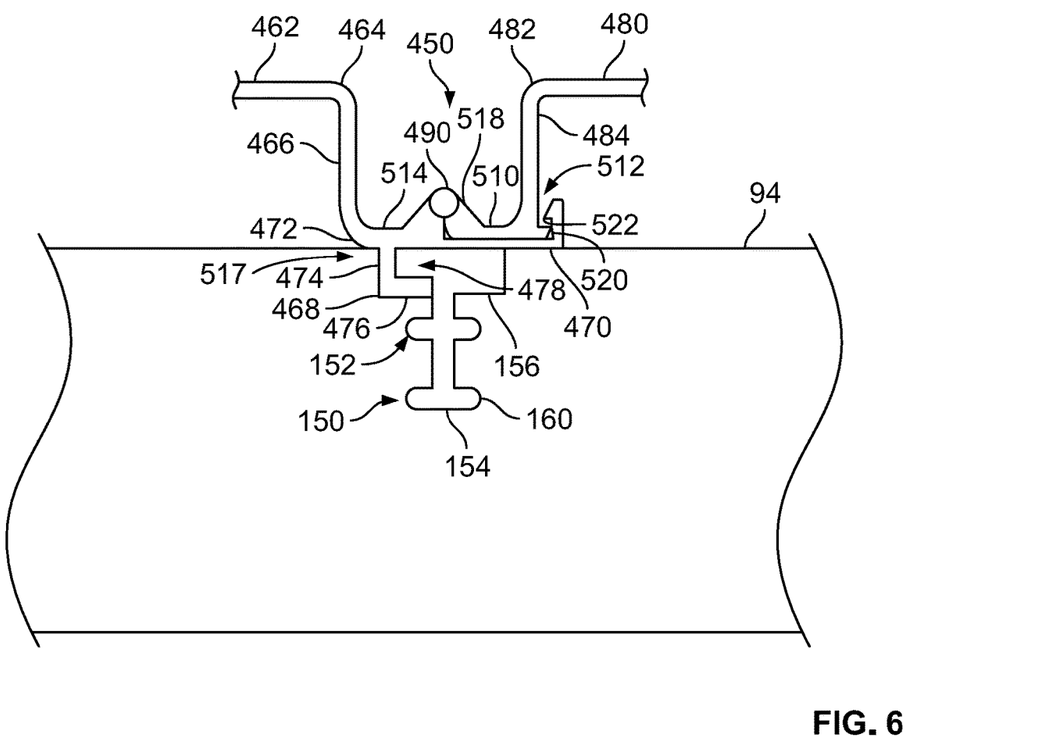
FIG. 6 is a side elevational view of a third embodiment of a floor assembly including the floor securing apparatus of FIG. 3.

Turning now to FIG. 6, a third embodiment of a floor assembly 450 is depicted. The floor assembly 450 includes the floor securing apparatus 150 of FIGS. 3-5, which comprises the floor riser slot 152 formed or machined into a floor riser 94 and a key 154, which is positioned within the floor riser slot 152. The floor assembly 450 further includes a first floor sheet 462 that has a first end 464 that includes a downwardly extending foot 466. A protrusion 468 extends from a lower surface 470 of a lower portion 472 of the downwardly extending foot 466. The protrusion 468 may be integral with the flooring sheet 462 or may be coupled to the flooring sheet 462 by bonding, welding, fasteners, or any other suitable means. In some embodiments, the protrusion 468 may form part of the floor securing apparatus 150. The protrusion 468 comprises a vertical section 474 and a horizontal section 476 that define a protrusion notch 478. The protrusion notch 478 is sized as to receive a portion of the upper slot portion 166 of the key 454, thereby vertically securing the first end 464 of the first floor sheet 462 to the floor riser 94 to prevent vertical movement of the floor sheet 462 relative to the floor riser 94 and prevent movement of the key 154 or the floor sheets in any direction other than along the longitudinal axis A of the floor riser slot 152 and key 154 (i.e., transverse to the longitudinal axis A of length of the slot 152 and key 154).

Still referring to FIG. 6, a second floor sheet 480 includes a second end 482 that includes a downwardly extending leg 484. A second foot 510 is extends from a lower end of the downwardly extending leg 484. The second foot 510 is sized to fit within a depression 512 defined in an upper surface 514 of the lower portion 472 of the downwardly extending foot 466. A first toe 516 extends upwardly from an upper surface 514 of the lower portion 472 of the downwardly extending foot 466. The first toe 516 is positioned adjacent the depression 512 such that the first floor sheet 462 may be permanently joined to the second floor sheet 480 by forming a weld bead on the first toe 516 and a second toe 518 which defines a distal end of the second foot 510 of the second floor sheet 480.

Similar to the first and second embodiments, during installation of one or more floor sheets 462, 480, the protrusion 468 is positioned within the upper slot portion 166 of the floor riser slot 152 and the key 154 is thereafter slid into the floor riser slot 152 with the head portion 156 of the key 154 positioned within the protrusion notch 468 of the first floor sheet 462, thereby retaining the first floor sheet 462 in position. The second floor sheet 480 is thereafter placed in position, as shown in FIG. 6, with the second foot 510 of the second floor sheet 480 positioned within the depression 512, and the weld beam 490 is placed along lengths of the first and second floor sheets 462, 480. This process is repeated for each floor sheet.

It is contemplated that the floor assembly 450 and/or the floor securing apparatus 150 may allow for the distribution of forces applied to the load surface over a larger surface area of the floor riser while reducing stress on the weld bead 490. The stress on the weld bead 490 is reduced by the capture and locking of the second foot 510 within the depression 512. It is also contemplated that the second foot 510 may include a locking heel 520 that locks the second foot 510 within the depression 512 by forming a snap fit with an inwardly facing protrusion 522 that is positioned on a side of the depression 512 opposing the first toe 516. When the second foot 510 is inserted into the depression 512, the locking heel 520 snaps past the inwardly facing protrusion 522, thereby locking the second foot 510 into the depression 512.

Figure 7:
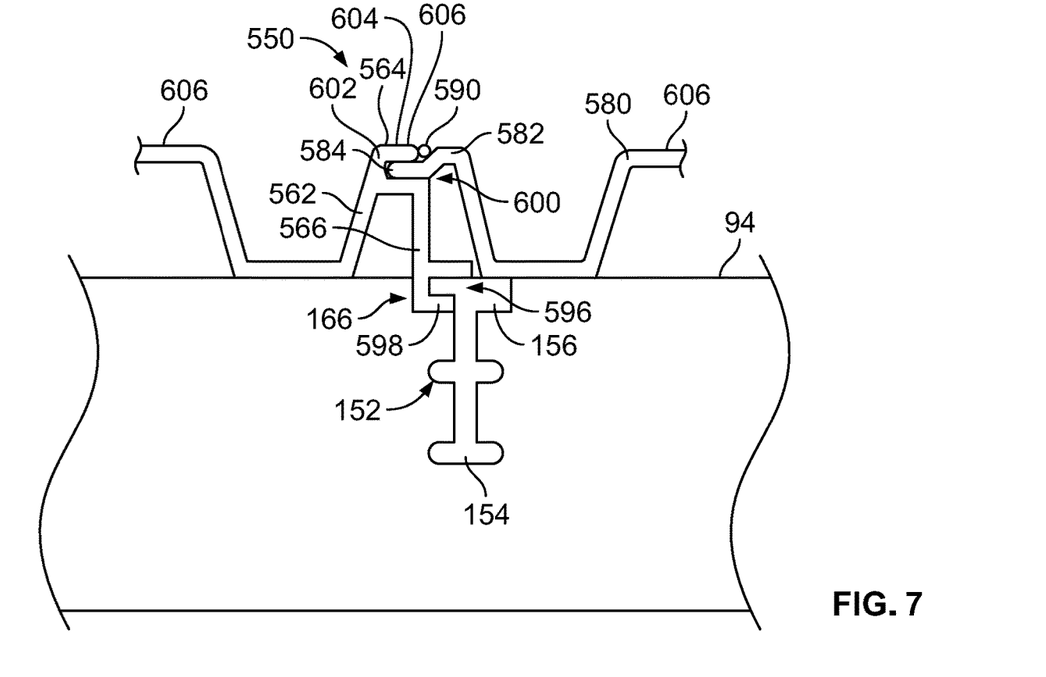
FIG. 7 is a side elevational view of a fourth embodiment of a floor assembly including the floor securing apparatus of FIG. 3.

Turning now to FIG. 7, a fourth embodiment of a floor assembly 550 is depicted. The floor assembly 550 includes the floor securing apparatus 150 of FIGS. 3-6 which comprises the floor riser slot 152 formed or machined into a floor riser 94 and a key 154, which is positioned within the floor riser slot 152. The floor assembly 550 further includes a first floor sheet 562 that has a first end 564. The first end 564 includes a downwardly extending foot 566. A horizontal notch 596 is formed by a protrusion 598 extending from the downwardly extending foot 566. The protrusion 598 may be integral with the floor sheet 562 or may be coupled to the floor sheet 562 by bonding, welding, fasteners, or any other suitable means. In some embodiments, the protrusion forms part of the floor securing apparatus 150. The horizontal notch 596 is sized to receive a portion of the head portion 156 of the key 154 when the protrusion 598 of the foot 566 is positioned within the floor riser slot 152. A horizontal notch 600 is also formed in the downwardly extending foot 566 adjacent an upper end 602 and below a horizontally extending finger 604. The horizontal notch 600 is configured to receive a horizontally extending flange 584 of a second end 582 of a second floor sheet 580. A portion of the horizontally extending flange 584 of the second floor sheet 580 is positioned within the horizontal notch 600. An upper surface of the horizontally extending finger 604 forms a portion of a floor load surface 606 defined by the floor sheets 562, 580. Upper ends of each of the foot 566 and the horizontally extending flange 584 may be angled to form a groove for depositing a weld bead 590 to join the first and second floor sheets 562, 580. In other embodiments, the upper ends of each of the foot 566 and the horizontally extending flange 584 may not be angled or may otherwise be formed to accommodate the weld bead 590.

Similar to the first embodiment, during installation of one or more floor sheets 562, 580, the protrusion 598 is positioned within the upper slot portion 166 of the floor riser slot 152 and the key 154 is thereafter slid into the floor riser slot 152 with the head portion 156 of the key 154 positioned within the protrusion notch 596 of the first floor sheet 562, thereby vertically retaining the first floor sheet 562 in position. The slot 152 and key 154 also prevent movement of the key 154 and the floor sheets in any direction other than along the longitudinal axis A of the floor riser slot 152 and key 154 (i.e., transverse to the longitudinal axis A of length of the slot 152 and key 154). The second floor sheet 580 is thereafter placed in position, as shown in FIG. 7, with the horizontally extending flange 584 positioned within the horizontal notch 600, and the weld bead 590 is placed along lengths of the first and second floor sheets 562, 580. This process is repeated for each floor sheet.

Figure 8:
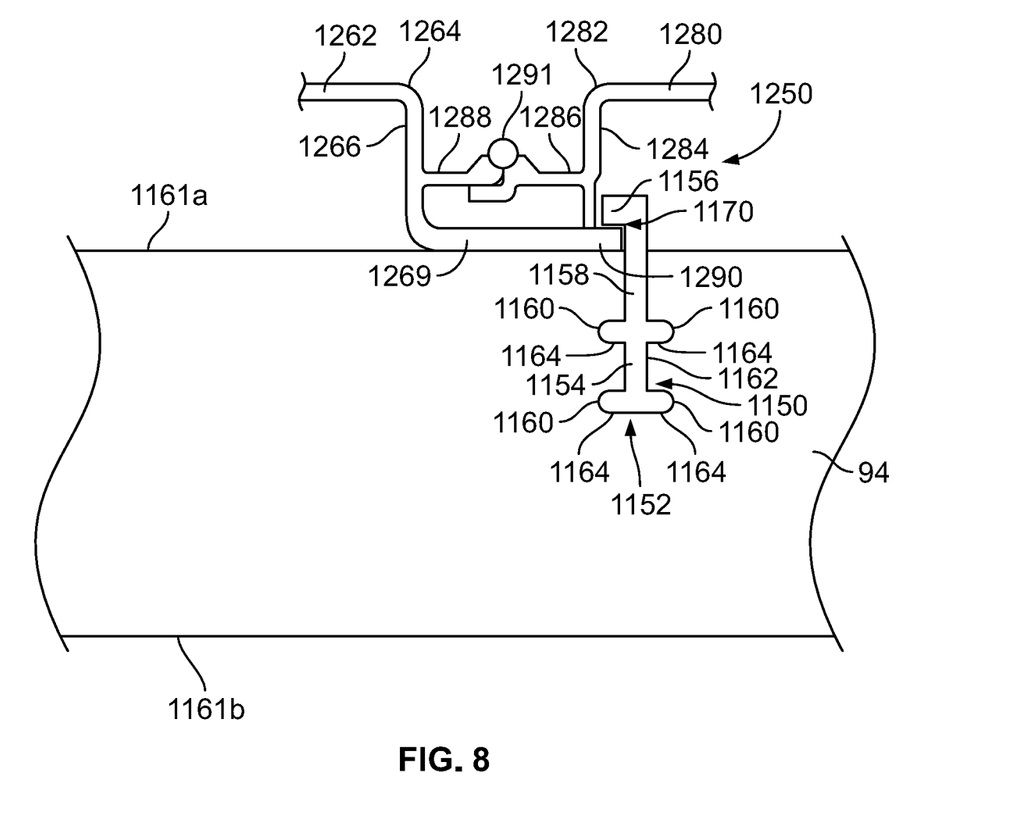
FIG. 8 is a side elevational view of a fifth embodiment of a floor assembly including a further embodiment of a floor securing apparatus.

Turning now to FIG. 8, a further embodiment of a floor securing apparatus 1150 is depicted within a floor assembly 1250. The floor securing apparatus 1150 comprises a floor riser slot 1152 machined or formed in a floor riser 94 and a key 1154, which is formed to slidingly engage a portion of the floor riser slot 1152. The key 1154 includes a locking head portion 1156, a spine 1158 that extends from the head portion 1156, and one or more anchor tabs 1160 that protrude outwardly from the spine 1158. The floor riser slot 1152 is formed in a first top surface 1161a of the floor riser 94 toward an opposing bottom surface 1161b. The floor riser slot 1152 generally includes a vertical slot portion 1162 extending into the floor riser 94 and a plurality of outwardly extending slot portions 1164 that are generally transverse to the vertical slot portion 1162 (although only one slot portion 1164 may be utilized, the vertical slot portion 1162 may not be vertical, and/or the slot portion(s) 1164 may be at an angle other than 90 degrees with respect to the vertical slot portion 1162).

At least a portion of the spine 1158 of the key 1154 is positioned within the vertical slot portion 1162 and the anchor tabs 1160 are positioned within the outwardly extending slot portions 1164. Unlike the previous embodiments, at least a portion of the spine 1158 of the key 1154 extends out of the vertical slot portion 1162 through the top surface 1161a of the floor riser 94 and the head portion 1156 is spaced from the top surface 1161a of the floor riser 94 to form a notch or cavity 1170, as will be discussed in greater detail below. The head portion 1156 of the key 1154 is configured to secure a portion of a floor sheet within the notch or cavity 1170 and the anchor tabs 1160 prevent the head portion 1156 and spine 1158 of the key 1154 from being pulled vertically out of the floor riser 94 or being moved in any direction other than along a longitudinal axis A of the floor riser slot 1152 and key 1154 (i.e., transverse to a longitudinal axis of length of the slot 1152 and key 1154). While the anchor tabs 1160 and the outwardly extending slot portions 1164 are shown as having a particular configuration, the anchor tabs 1160 and outwardly extending slot portions 1164 may take other shapes, could be formed at any angle, or may be modified in any other suitable way, so long as vertical movement between the floor riser slot 1152 and the key 1154 and movement of the floor riser transverse to the longitudinal axis of the floor riser slot 152 and key 154 are prevented.

Still referring to FIG. 8, the floor assembly 1250 includes the floor securing apparatus 1150 and a first floor sheet 1262 that has a first end 1264 that includes a downwardly extending foot 1266 having a having a lower portion 1269 that, in use, is positioned adjacent the floor riser 94. The floor assembly 1250 may also include a second floor sheet 1280 including a second end 1282 that includes a downward extending leg 1284. The downwardly extending leg 1284 may extend to the floor riser 94 to provide support to the second floor sheet 1280 or may extend to the lower portion 1269 of the first floor sheet 1262, which rests on the floor riser 94, to provide support to the first and second floor sheets 1262, 1280. A second end coupling extension 1286 extends outwardly from the downwardly extending leg 1284 toward the first end 1264 of the first floor sheet 1262 when the second end 1282 of the second floor sheet 1280 is positioned adjacent the first end 1264 of the first floor sheet 1262. The second end coupling extension 1286 receives and contacts a first end coupling extension 1288 of the first floor sheet 1262, which extends from the downwardly extending foot 1266. The first floor sheet 1262 and the second floor sheet 1280 may be permanently joined by placing a weld bead 1291 along the ends of the first end coupling extension 1288 and second end coupling extension 1286.

During installation of one or more floor sheets 1262, 1280, the floor sheets 1262, 1280 are positioned as shown in FIG. 8. The key 1254 is thereafter positioned in the slot 1152 with the spine 1158 within the vertical slot 1162 portion, the anchor tabs 1160 within the outwardly extending slot portions 1164, and with an end 1290 of the lower portion 1269 of the first floor sheet 1262 within the notch or cavity 1170. The key 1254 is then slid into the floor riser slot 1252 in a direction perpendicular to a longitudinal axis of the floor riser 94. Optionally, the first floor sheet 1262 may be positioned, the key 1254 may be slid into place, and the second floor sheet 1280 may then be positioned as shown in FIG. 8. Regardless, once the floor sheets 1262, 1280 and/or the key 1254 are positioned, the weld beam 1291 is placed along lengths of the first and second floor sheets 1262, 1280. This process is repeated for each floor sheet.

It is contemplated that a load surface of the refrigerated trailer 50 is formed by multiple sections of floor sheets 1262, 1280 secured to the floor risers 94 by the floor securing apparatus 1250. Each floor sheet 1262 includes a first end 1264 and an opposing second end 1282; therefore, by joining a series of floor sheets 1262, a continuous flooring surface can be formed above the floor risers 94 between the sidewalls 54. It is also contemplated that a lower portion of the inner skin 72 of the sidewall 54 may include an appropriate structure to couple with the first end 1264 or the second end 1282 of the floor sheets 262 depending on what side of the refrigerated trailer 50 the inner skin is positioned. It is also contemplated that a series of floor riser slots 1152 may be pre-machined or formed in the floor risers 94 prior to positioning the floor risers 94 for assembly. Thus, the positions of the floor sheets 1262, 1280 are pre-determined and simple for the location and installation of the floor sheets 1262, 1280. Further, the floor sheets 1262, 1280 may be formed from extrusion or other known processes. The pre-forming of the floor riser slots 1152 also allows for the exact fitting of the floor sheets 1262, 1280 and thus labor costs and material waste are reduced or eliminated. It is also contemplated that the keys 1154 may be retained within the floor riser slot 1152 after the floor cavity 104 is filled with the floor foam core 100.

In the embodiment of FIG. 8, the elimination of the protrusion, for example, element 268 of FIG. 4, allows for ease in stacking of similar floor sheets.

While the floor securing apparatuses of the present disclosure are described as securing flooring sections or sheets for a refrigerated van or trailer, it should be understood that the floor securing apparatuses may be utilized to secure any flooring sections in any vehicle, for example, trailers, truck bodies, dry van or refrigerated trailers, refrigerated dry vans, flat beds, tanks, or any other vehicles.

The floor securing apparatuses disclosed herein (including the slots, keys, and/or protrusions, for example) prevent movement of both the key and floor sheets in a vertical direction and in any direction other than along the longitudinal axis A of the floor riser slot 152 and key 154 (i.e., transverse to a longitudinal axis of length of the slot 152 and key 154).

Any of the embodiments described herein may be modified to include any of the structures or methodologies disclosed in connection with other embodiments.

Numerous modifications to the present disclosure will be apparent to those skilled in the art in view of the foregoing description. Accordingly, this description is to be construed as illustrative only and is presented for the purpose of enabling those skilled in the art to make and use the embodiments of the present disclosure and to teach the best mode of carrying out same. The exclusive rights to all modifications which come within the scope of the appended claims are reserved.

I claim:

1. A floor assembly, comprising:
 a floor sheet including a lower portion;
 a floor riser configured to support the floor sheet, the floor riser including a riser slot formed therein, extending from a top surface toward a bottom surface thereof; and
 a key including a locking head, wherein the key is positioned within the riser slot with a portion of the locking head engaging the lower portion of the floor sheet to secure the floor sheet to the floor riser and prevent vertical movement of the floor sheet relative to the floor riser.

2. The floor assembly of claim 1, wherein the locking head is spaced from the top surface of the floor riser to define a notch and an end of the lower portion of the floor sheet is positioned within the notch.

3. The floor assembly of claim 2, wherein the notch extends a full length of the floor sheet.

4. The floor assembly of claim 1, wherein the key further includes a spine and at least one anchor tab disposed transverse to the spine.

5. The floor assembly of claim 4, wherein the riser slot includes a vertical slot portion and an outwardly extending slot portion extending from the vertical slot portion; and the spine of the key is configured to be received in the vertical slot portion, and the anchor tab of the key is configured to extend into the outwardly extending slot portion.

6. The floor assembly of claim 4, wherein the at least one anchor tab includes a plurality of anchor tabs spaced apart along a length of the spine.

7. The floor assembly of claim 4, wherein the at least one anchor tab includes two anchor tabs extending in opposite directions from the spine.

8. The floor assembly of claim 1, wherein the lower portion of the floor sheet is configured to rest upon the top surface of the floor riser.

9. The floor assembly of claim 1, wherein the floor riser further includes a plurality of riser slots spaced apart such that a number of floor sheets may be connected to one another, thereby forming a continuous flooring surface.

10. The floor assembly of claim 1, wherein the key is configured to be slid into the riser slot in a direction perpendicular to a longitudinal axis of the floor riser.

11. The floor assembly of claim 1, wherein the floor sheet includes a first end and a second end, wherein the second end is configured to mate with a subsequent first end of a further floor sheet.

12. The floor assembly of claim 11, wherein the second end of the floor sheet is connected to the subsequent first end of the further floor sheet by a weld.

13. The floor assembly of claim 1, wherein
 a first end of the floor sheet includes a downwardly extending foot having a first coupling extension that extends away from the floor sheet;
 a second end of the floor sheet includes a downwardly extending leg having a second coupling extension extending away from the floor sheet; and
 the first and second coupling extensions of different floor sheets are positioned adjacent one another when the different floor sheets are connected and the first and second coupling extensions are further configured to be welded together.

14. A method of assembling floor sections using a floor securing apparatus, the floor securing apparatus including a first floor sheet with a lower portion, a floor riser having a riser slot formed therein, extending from a top surface toward a bottom surface thereof, and a key including a locking head and at least one anchor tab, the method comprising the steps of:
 positioning the first floor sheet along the floor riser so that the lower portion rests on the top surface of the floor riser; and
 sliding the key into the riser slot so that a portion of the locking head engages the lower portion of the first floor sheet to secure the first floor sheet to the floor riser and prevent vertical movement of the first floor sheet relative to the floor riser.

15. The method of claim 14, further comprising positioning a second floor sheet identical to the first floor sheet adjacent to the first floor sheet; and welding the second floor sheet to the first floor sheet.

16. The method of claim 15, wherein positioning the second floor sheet adjacent to the first floor sheet includes positioning a second coupling extension extending away from the second floor sheet adjacent a first coupling extension extending away from the first floor sheet; and welding the second floor sheet to the first floor sheet includes placing a weld bead along ends of the first coupling extension and the second coupling extension.

17. A floor securing apparatus configured to secure a floor sheet of a floor assembly, the floor securing apparatus comprising:

a riser slot formed in a floor riser, extending from a top surface toward a bottom surface of the floor riser, the floor riser configured to support the floor sheet; and a key including a locking head and at least one anchor tab, the key being slidable into the riser slot and configured to engage a portion of the floor sheet when slid into the riser slot to prevent vertical movement of the floor sheet relative to the floor riser.

18. The floor securing apparatus of claim 17, wherein the locking head is positioned above the top surface of the floor riser when the key is positioned within the riser slot.

19. The floor securing apparatus of claim 17, wherein a lower surface of the locking head and the top surface of the floor riser form a notch into which a portion of a floor sheet is configured to be positioned to prevent vertical movement of the floor sheet relative to the floor riser.

20. The floor securing apparatus of claim 17, wherein the key is slidable into the riser slot transverse to a longitudinal axis of the floor riser.

* * * * *